United States Patent Office 2,970,681
Patented Feb. 7, 1961

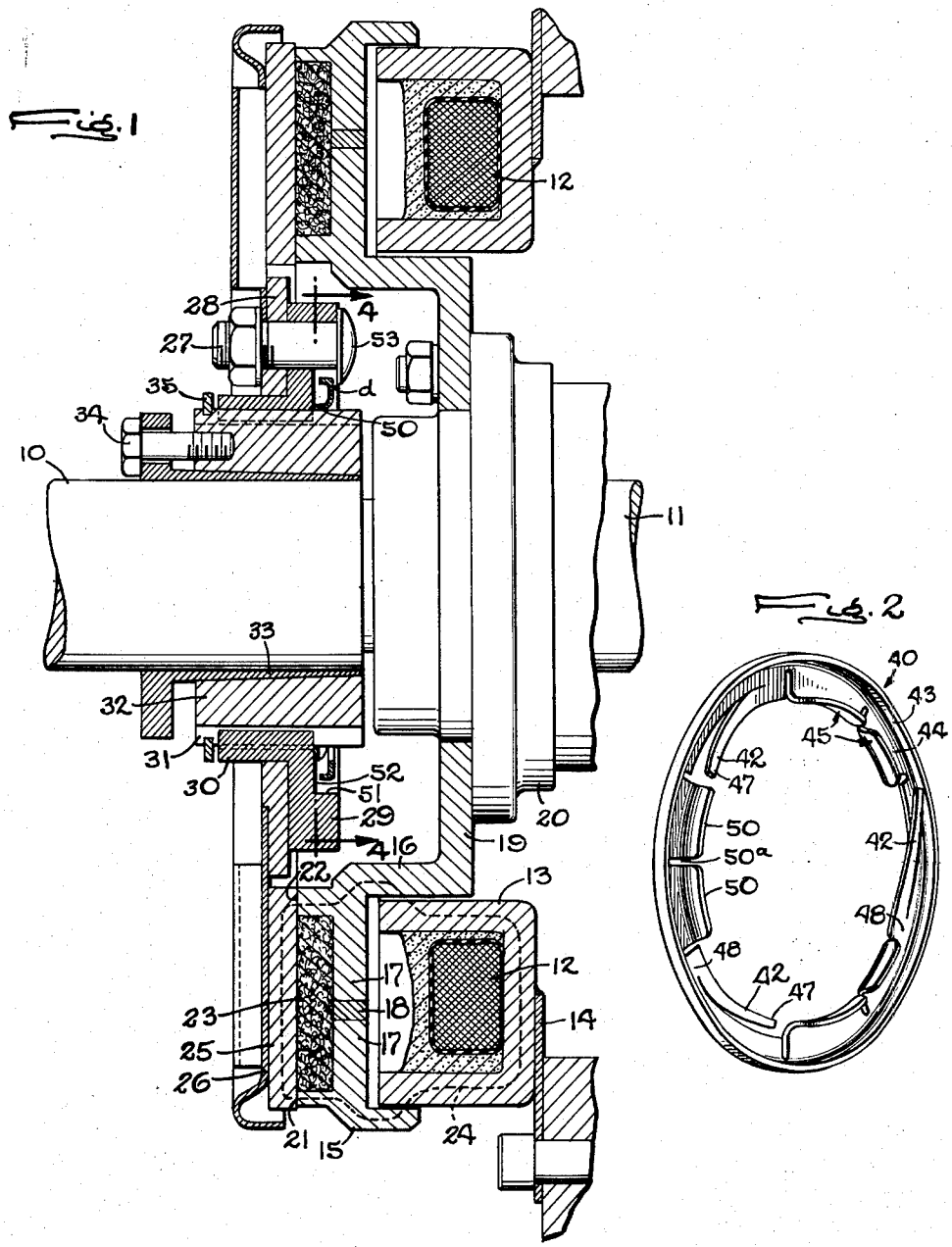

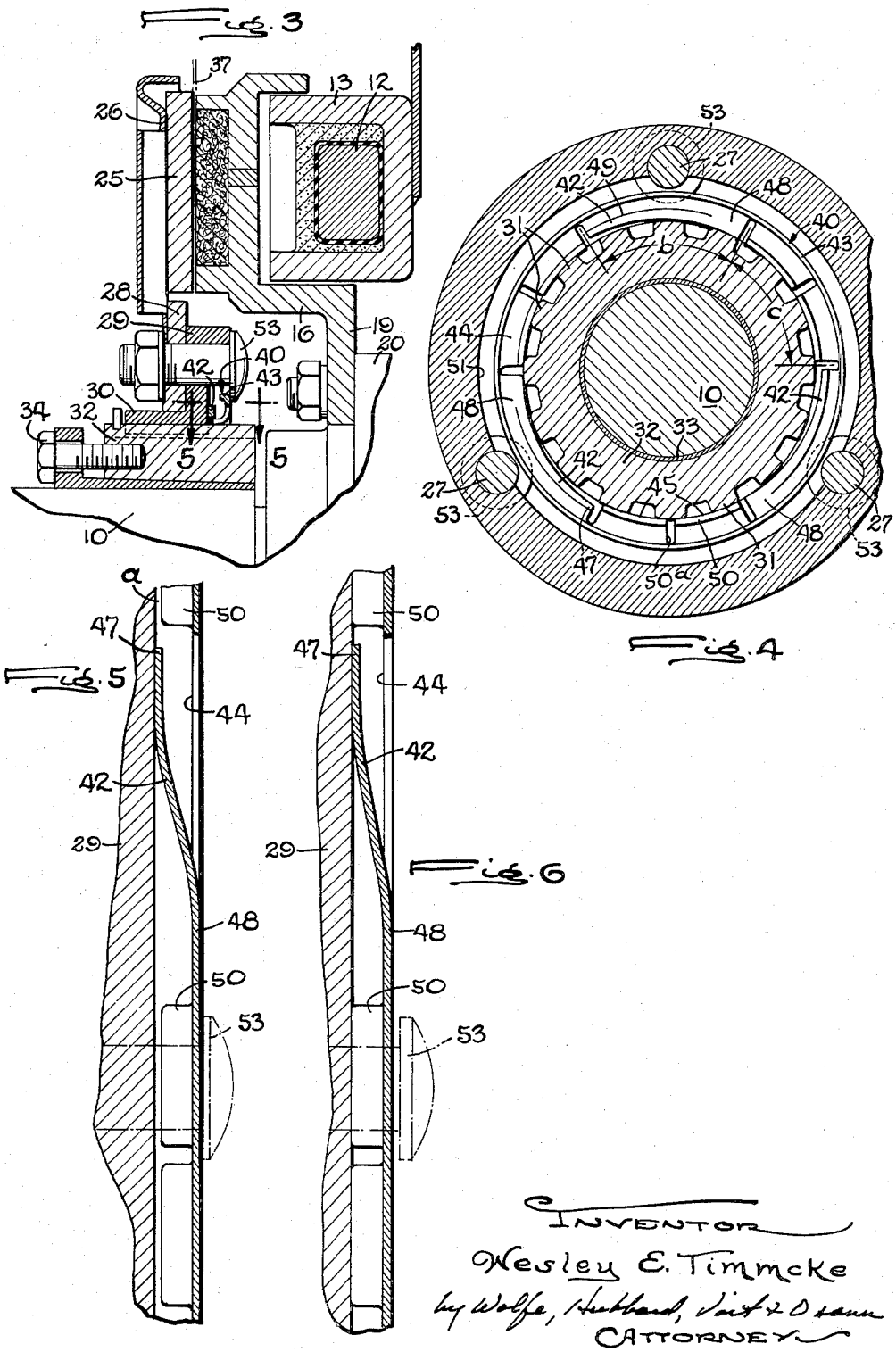

2,970,681

WEAR ADJUSTER FOR MAGNETIC FRICTION DEVICES

Wesley E. Timmcke, Beloit, Wis., assignor to Warner Electric Brake & Clutch Company, South Beloit, Ill., a corporation of Illinois Filed Feb. 20, 1959, Ser. No. 794,542

6 Claims. (Cl. 192—111)

This invention relates to a magnetic friction clutch or brake of the type in which friction rings are normally maintained separated from each other by a narrow gap and drawn into axial gripping engagement by magnetic flux threading a toroidal circuit through the rings.

The invention is more particularly concerned with the provision of a device of the type shown in Patent No. 2,705,058 for automatically adjusting the axial position of one of the friction rings so as to maintain the gap between the rings of substantially uniform width in spite of the wearing off of the friction faces in service use. As shown in Figs. 10 and 11 of said patent, such a device may be formed from resilient sheet metal as an integral stamping having an arcuate hub portion for frictionally gripping a support for one of the magnet rings and resilient fingers for moving such ring away from the coacting ring to maintain the desired separation of the two rings when the clutch or brake is inactive.

The present invention aims to improve on said patented device by adapting the same for use in larger sizes and by providing for more uniform and controllable gripping of the support surface and overall radial compactness.

A more detailed object is to form the wear adjusting device as a ring of channel cross-section and utilize certain angularly spaced portions of the inner flange as the gripping fingers and the intervening portions of the ring as the separating springs.

Other objects and advantages of the invention will become apparent from the following detailed description taken in connection with the accompanying drawings, in which—

Figure 1 is a vertical sectional view of a magnetic friction clutch embodying the novel features of the present invention.

Fig. 2 is a perspective view of the stop ring.

Fig. 3 is a fragmentary view of a portion of Fig. 1 showing the parts in a different position.

Fig. 4 is a fragmentary cross-sectional view taken along the line 4—4 of Fig. 1.

Figs. 5 and 6 are enlarged development views taken along the line 5—5 of Fig. 3 and showing the parts in different positions.

For purposes of illustration, the improved wear adjusting device is shown in the drawings incorporated in a magnetic clutch of the stationary field type for frictionally coupling a driving shaft 10 to a driven shaft 11 in response to energization of a winding 12 secured to and disposed within the concentric legs of an annular magnetic core 13 of U-shaped cross-section. A bracket 14 mounted on a stationary support and attached to the back of the core supports the latter with the legs thereof concentric with the axis of the shafts 10 and 11.

The legs of the core telescope closely with the rear ends of two magnetic pole rings 15 and 16 having inwardly projecting flanges 17 disposed intermediate their ends and rigidly joined by segments 18 of high magnetic reluctance. A flange 19 turned inwardly from the inner ring 16 is bolted to a hub 20 on the driven shaft 11. At their opposite ends, the rings 15 and 16 terminate in axially facing pole faces 21 and 22 flush with the exposed face of segments 23 of friction material seated against the flanges 17.

The toroidal flux path 24 enclosing the coil 12 is completed by an armature ring 25 which may be composed of a plurality of segments arranged end to end around a backing plate 26 to which the segments are welded or otherwise suitably secured. Bolts 27 angularly spaced around the inner periphery of the plate 26 clamp the latter to a ring 28 and an out-turned flange 29 on a sleeve 30. The latter is formed with spline teeth meshing with teeth 31 around the outer periphery of a sleeve 32 securely locked to the inner end of the drive shaft 10. Herein, this is accomplished by a tubular wedge 33 driven into the sleeve 32 by tightening screws 34. A snap ring 35 received in an outwardly opening groove in the sleeve 32 provides a stop for limiting axial movement of the drive sleeve 30 and armature 25 away from the pole faces of the magnet.

When the winding 12 is energized with the shaft 10 turning, magnetic flux threading the circuit 24 into and out of the armature 25 causes the latter to be attracted to the pole faces 21, 22 thus frictionally coupling the shafts together. Transmission of torque is interrupted when the winding is deenergized. At this time, it is desirable to push the armature back out of contact with the pole faces a predetermined distance 37 (Fig. 3) which is maintained constant in spite of wearing off of the pole or armature faces. As in Figs. 10 and 11 of the patent mentioned above, this is accomplished by a sheet metal ring 40 which surrounds and frictionally grips a cylindrical surface 31 of the armature support 32 and is formed with angularly spaced spring fingers 42 engaging the armature at their free ends so as to be bent and thereby stressed as the armature is attracted to the magnet pole but acting, when the magnet is deenergized, to push the armature away by the amount 37.

The present invention contemplates a new and improved construction of the ring to provide for the handling of heavier armatures and for maintaining the gap more uniformly and of an accurately selected width. To these ends, the ring 40 is stamped out of resilient high carbon steel (for example No. 1035) about 1/16 of an inch thick and formed into a channel having a continuous and substantially right angular narrow outer flange 43, a generally flat bottom 44 and an inner flange 45 somewhat deeper than the outer flange 43 and of more gradual arcuate cross-section.

Angularly spaced sectors $b$ (Fig. 4) of the inner flange are cut away and the adjacent metal of the ring bottom 44 is split along circumferentially extending lines 49 to form the fingers 42 which are elongated and extended tangentially over substantially the full arcuate length of the sectors $b$ and preferably taper gradually to their free ends 47. These cantilever fingers are bent up axially from their anchor points 48 to dispose the ends 47 above the free edge of the flange 45 by an amount $a$ (Fig. 5) which, as will appear later, is somewhat greater than the width of the gap 37 desired to be maintained between the armature and pole faces when the clutch is released.

Three of the spring fingers are employed in the present instances, these being angularly spaced equidistantly around the ring 40. The intervening sectors $c$ of the inner flange 45 and the corresponding portions of the channel bottom are divided by radial notches 50a into a plurality, three in the present instance, of lugs 50 whose inner arcuate ends fit closely around the tips of the spline teeth 31 and provide surfaces of substantial area for gripping these teeth under pressure determined by the stiffness of the lugs 50 and their resistance to axial bending. The lugs thus contracted resiliently around the splined sleeve 32 produce a combined frictional gripping force which is sufficient to hold the ring in fixed axial position when the clutch is deenergized but less than the force exerted by the magnet in attracting the armature 25 to the pole faces.

The stiffness of the spring fingers 42 is also correlated with the friction force resisting sliding of the ring 40 along the sleeve 32. That is to say, the fingers are adapted to bend axially under a force substantially less than the friction holding force.

The ring 40 thus constructed is pressed onto the sleeve 32 in a counterbored annular recess 51 in the inner flange end of sleeve 30 with the fingers 42 facing toward and in contact with the bottom 52 of the recess. The depth of the recess 51 is such that with the armature attracted against the magnet and the ends 47 of the fingers bent axially into the plane of the edge of the flange 45 as shown in Fig. 1, the back surface of the ring will be spaced from the heads 53 of the bolts 27 a distance $d$ which is equal to the width of the gap $a$ desired to be maintained between the armature and pole faces when the clutch is released. The recess 51 is made large enough to expose the bolt heads which thus act not only as a stop for preventing creeping of the ring along its support under service vibration but also as an abutment engageable with the stop ring 40 to limit the separation of the armature upon release of the clutch.

I claim as my invention:

1. In a magnetic torque producing device, the combination of, two relatively rotatable rings adapted to be drawn into axial gripping engagement, magnetic means for drawing said rings into abutment under a predetermined force, one of said rings being axially fixed, a member supporting the other ring for axial sliding along the member into and out of abutment with the fixed ring, an annulus of resilient sheet metal and channel cross-section encircling said member and having axially projecting inner and outer flanges, said outer flange being substantially continuous and said inner flange being of arcuate cross-section, a plurality of angularly spaced groups of circumferentially spaced slits splitting said inner flange and extending outwardly across the channel bottom whereby to form radially flexible sectors frictionally gripping said member, and a plurality of tangentially projecting angularly spaced resilient fingers stamped out of the bottom of said channel between said groups of sectors and bearing at their free ends against said movable ring, said fingers being flexed during magnetic attraction of said rings together under said force and acting upon release thereof to separate said rings by a predetermined gap.

2. In a magnetic torque producing device, the combination of, two relatively rotatable rings adapted to be drawn into axial gripping engagement, magnetic means for drawing said rings into abutment under a predetermined force, one of said rings being axially fixed, a member supporting the other ring for axial sliding along the member into and out of abutment with the fixed ring, an annulus of resilient sheet metal and channel cross-section encircling said member and having axially projecting inner and outer flanges, said outer flange being substantially continuous and said inner flange being of arcuate cross-section, a plurality of angularly spaced groups of circumferentially spaced radial notches splitting said inner flange and extending outwardly across the channel bottom whereby to form radially flexible arcuate lugs frictionally gripping said member, a plurality of tangentially projecting angularly spaced resilient fingers stamped out of the bottom of said channel between said groups of lugs and bearing at their free ends against said movable ring, said fingers being flexed during magnetic attraction of said rings together under said force and acting upon release thereof to separate said rings, and an abutment on said movable ring engageable with said annulus to limit the separation of the rings.

3. In a magnetic torque producing device, the combination of, two relatively rotatable rings adapted to be drawn into axial gripping engagement, magnetic means for drawing said rings into abutment under a predetermined force, one of said rings being axially fixed, a member supporting the other ring for axial sliding along the member into and out of abutment with the fixed ring, a stop ring of resilient sheet metal and having an axially projecting flange of arcuate cross-section around its inner periphery, a plurality of angularly spaced groups of circumferentially spaced radial notches dividing said flange and extending outwardly across the main portion of the stop ring whereby to form radially flexible sectors frictionally gripping said member, a plurality of tangentially projecting angularly spaced fingers stamped out of the metal of said stop ring in the spaces intervening between said groups of sectors and bearing at their free ends against said movable ring, said fingers being axially flexed during magnetic attraction of said rings together under said force and acting upon release thereof to separate said rings by a predetermined gap, and an abutment on said movable ring engageable with said stop ring to limit the separation of said magnetic rings by said fingers.

4. In a magnetic torque producing device, the combination of, two relatively rotatable rings adapted to be drawn into axial gripping engagement, magnetic means for drawing said rings into abutment under a predetermined force, one of said rings being axially fixed, a member supporting the other ring for axial sliding along the member into and out of abutment with the fixed ring, an annulus of resilient sheet metal encircling said member and having an axially projecting inner flange, a p'urality of angularly spaced slits splitting said flange and extending outwardly partially across the annulus whereby to form a plurality of radially flexible sectors frictionally gripping said member, and a plurality of tangentially projecting angularly spaced resilient fingers rigid with said annulus and bearing at their free ends against said movable ring, said fingers being flexed during magnetic attraction of said rings together under sa'd force and acting upon release thereof to separate said rings by a predetermined gap.

5. A magnetic torque producing device as defined in claim 4 in which said annulus is a continuous rigid ring.

6. A magnetic torque producing device as defined in claim 4 including an abutment acting positively to limit the extent of separation of said rings by said fingers.

No references cited.